(12) United States Patent
Kumar et al.

(10) Patent No.: US 10,684,115 B2
(45) Date of Patent: Jun. 16, 2020

(54) ENCODER FOR OPTICAL COHERENCE TOMOGRAPHY SCANNER

(71) Applicant: 3SHAPE A/S, Cophenhagen K (DK)

(72) Inventors: Ashwani Kumar, Copenhagen S (DK); Deepak Vijayakumar Nair, Brønshøj (DK); Erik Ask, Malmö (SE); Karl-Josef Hollenbeck, København Ø (DK)

(73) Assignee: 3Shape A/S, Kobenhavn K (DK)

( * ) Notice: Subject to any disclaimer, the term of this patent is extended or adjusted under 35 U.S.C. 154(b) by 83 days.

(21) Appl. No.: 16/067,337

(22) PCT Filed: Jan. 20, 2017

(86) PCT No.: PCT/EP2017/051225
§ 371 (c)(1),
(2) Date: Jun. 29, 2018

(87) PCT Pub. No.: WO2017/125570
PCT Pub. Date: Jul. 27, 2017

(65) Prior Publication Data
US 2019/0011250 A1    Jan. 10, 2019

(30) Foreign Application Priority Data
Jan. 22, 2016 (DK) .................. 2016 70036

(51) Int. Cl.
*G01B 9/02* (2006.01)
*G01D 5/347* (2006.01)

(52) U.S. Cl.
CPC ..... *G01B 9/02091* (2013.01); *G01B 9/02072* (2013.04); *G01D 5/34761* (2013.01); *G06T 2207/10101* (2013.01)

(58) Field of Classification Search
CPC ....... A61B 3/102; A61B 5/066; A61B 5/0073; G01B 9/02091; G01B 9/0209; G01D 5/34746; G01D 5/34761
See application file for complete search history.

(56) References Cited

U.S. PATENT DOCUMENTS 5,846,650 A * 12/1998 Ko .................... G02B 1/105
                                                        428/336
6,958,207 B1 * 10/2005 Khusnatdinov .......... G02B 1/11
                                                        430/321

(Continued)

FOREIGN PATENT DOCUMENTS

JP      2011-158309 A      8/2011

OTHER PUBLICATIONS

Office Action (Communication) dated Jul. 17, 2019, by the European Patent Office in corresponding European Patent Application No. 17700986.7. (4 pages).

(Continued)

*Primary Examiner* — Michael P LaPage
(74) *Attorney, Agent, or Firm* — Buchanan Ingersoll & Rooney PC

(57) ABSTRACT

Disclosed is an optical coherence tomography scanner and a method for recording sub-surface scans of an object, wherein a position encoder is arranged in the path of the probing beam of an interferometric system. The encoder pattern is detected in a sequence of A scans at generated for different probing beam positions on the scanned object, the probing beam position and/or inclination for at least one A scan of said sequence of A scans is deducing based on the detected encoder pattern, and the sub-surface scan of the object is generated based on the sequence of A scans taking into account the deduced probing beam position and/or inclination.

9 Claims, 4 Drawing Sheets

(56) References Cited

U.S. PATENT DOCUMENTS

| | | | |
|---|---|---|---|
| 2003/0047674 A1 | 3/2003 | Thornburn et al. | |
| 2010/0141829 A1 | 6/2010 | Jalali et al. | |
| 2011/0085232 A1* | 4/2011 | Werner | B82Y 20/00 |
| | | | 359/350 |
| 2014/0078512 A1 | 3/2014 | Kang et al. | |
| 2014/0107960 A1 | 4/2014 | Oritz Egea et al. | |
| 2016/0309068 A1* | 10/2016 | Nadeau | G01J 3/2846 |

OTHER PUBLICATIONS

International Search Report (PCT/ISA/210) dated Mar. 29, 2017, by the European Patent Office as the International Searching Authority for International Application No. PCT/EP2017/051225.

Wang et al., "Correction of image distortions in endoscopic optical coherence tomography based on two-axis scanning MEMS mirrors", Biomedical Optics Express 4 (10), 2013, pp. 2066-2077.

Westphal et al., "Correction of geometric and refractive image distortions in optical coherence tomography applying Fermat's principle", Optics Express 10 (9), 2002, pp. 397-404.

Ortiz et al., "Optical coherence tomography for quantitative surface topography", Applied Optics, Optical Society of America, Washington, DC, US, vol. 48, No. 35, Dec. 10, 2009, pp. 6708-6715.

\* cited by examiner

ENCODER FOR OPTICAL COHERENCE TOMOGRAPHY SCANNER

TECHNICAL FIELD

The present invention relates to optical coherence tomography (OCT), particularly to establishing geometrically correct B scans and C scans.

BACKGROUND

Optical coherence tomography (OCT) allows sub-surface imaging along a beam of coherent light providing 1D imaging of the sub-surface structure of the scanned object (a so-called A scan). Some background information on OCT can, e.g., be found in US20140078512.

To apply OCT to 2D and 3D imaging, the beam of an interferometric system is typically moved over the object using an actuated mirror, typically MEMS mirror, such that a sequence of A scans can be assembled to B and C scans which provide 2D and 3D information, respectively, of the scanned object. Such an OCT scanner is a particular type of an optical scanner, however not just acquiring a distance to the scanned object's surface for every beam position, but also an image of the sub-surface structure.

For image reconstruction to be geometrically accurate in the B and C directions, the position of the beam is required to be known to a great accuracy during the acquisition of all A scans. In the prior art, the MEMS mirror position is taken to be a well-defined function of driving voltage, which can be controlled accurately. However, the response of the mirror to the applied driving voltage can change with temperature, ageing of the mirror and any inaccuracy in driving electronics for the mirror. Furthermore, the mirror may display lags due to inertia or hysteresis on its trajectory. Given that MEMS mirrors typically oscillate in the B direction with more than 1 kHz, a forward-only control of their position is thus not optimal.

An optimal position tracking requires the use of some kind of external encoding mechanism. Optical encoders are widely known in the art. Typically, a glass substrate with a well-defined pattern is arranged in a position that is fixed relative to that of the object whose motion is to the tracked, hence following the object's motion, and some stationary photosensitive sensor detects light reflected by the pattern. For example, for a glass scale with equidistant reflecting regions, a position can be established by counting the pulses from the sensor when the glass scale moves relative to the sensor.

SUMMARY

Disclosed is an optical coherence tomography (OCT) scanner, a method for optical coherence tomography scanning and a position encoder for encoding the position of the probing beam of an optical coherence tomography scanner, where the position encoder is located in the optical path of said probing beam and comprises a pattern of regions with alternating transmissivities.

Disclosed is an optical coherence tomography scanner for recording sub-surface scans of an object, wherein the optical coherence tomography scanner comprises:
  an interferometric system configured for projecting a probing beam onto the scanned object and recording sub-surface data at different probing beam positions on the scanned object;
  a position encoder arranged in the path of the probing beam, where the encoder comprises a pattern at least partly formed by a plurality of first regions of a first transmissivity and a plurality of second regions of a second transmissivity, where the first transmissivity is higher than the second transmissivity; and
  a computing system comprising a non-transitory computer readable medium on which algorithms are stored as instructions and a data processing unit for executing the instructions of the algorithms, where the algorithms are configured for:
    generating a sequence of A scans from the recorded sub-surface data;
    detecting the encoder pattern in said sequence of said A scans;
    deducing based on the detected encoder pattern the probing beam position and/or inclination for at least one A scan of said sequence of A scans; and
    generating a sub-surface scan of the object based on the sequence of A scans taking into account the deduced probing beam position and/or inclination.

Disclosed is a method for recording sub-surface scans of an object using an optical coherence tomography scanner, said method comprising:
  obtaining an optical coherence tomography scanner comprising:
    i. an interferometric system configured for projecting a probing beam onto the scanned object and recording sub-surface data at different probing beam positions on the scanned object; and
    ii. a position encoder arranged in the path of the probing beam, where the encoder comprises a pattern at least partly formed by a plurality of first regions of a first transmissivity and a plurality of second regions of a second transmissivity, where the first transmissivity is higher than the second transmissivity;
  recording sub-surface data for different probing beam positions on the object;
  generating a sequence of A scans from the recorded sub-surface data;
  detecting the encoder pattern in said sequence of said A scans;
  deducing based on the detected encoder pattern the probing beam position and/or inclination for at least one A scan of said sequence of A scans; and
  generating a sub-surface scan of the object based on the sequence of A scans taking into account the deduced probing beam position and/or inclination.

One advantage of the disclosed OCT scanner and method is that geometrically correct sub-surface scans, such as B and C scans, can be recorded for an object by taking into account the deduced probing beam position and/or inclination. This may involve correcting for difference in the position and/or inclination of the A scans of the sequence when generating the sub-surface scan.

This invention is useful with any kind of moving-beam OCT, both with frequency-swept lasers and broadband light sources.

Definitions

Sub-surface scan of an object: a scan expressing the presence and distribution of sub-surface structures in the object. Often the sub-surface scan also include data relating to the surface of the object.

Swept source laser: a laser wherein the frequency of the emitted light varies in time.

Swept source OCT system: an OCT system wherein the frequency of the light in the probing beam is varied during an A scan.

A scan: an A scan is obtained at one position of the probing beam on the scanned object and provides a 1D depth reflectance profile along the beam path. For a swept source OCT system, the A scan is often derived by a Fourier Transformation of the recorded data. The probing beam is preferably substantially stationary on the object surface while the sub-surface data for a single A scan is recorded. A scans can be generated for a number of different positions of the probing beam on the object surface such that a sequence of A scans is generated.

B scan: a sub-surface scan often generated from number of A scans generated from sub-surface data recorded at different positions of the probing beam along a so-called B direction, which often is a straight line. The B scan may be in the form of a digital 2D representation of a 2D cross sectional view of the object.

C scan: a sub-surface scan of an object often provided as a 3D representation of the depth reflectance profile for the scanned object. The C scan is often generated from number of B scans recorded at different C directions.

B direction: the direction along which a sequence of A scans forming a B scan are acquired.

C direction: the direction perpendicular to the A and B directions. Typically along which a sequence of B scans forming the C scan are acquired.

Transmissivity: a measure of the ability of a material or medium to transmit electromagnetic energy as light.

The interferometric system preferably comprises a light source for generating the probing beam, a reference arm with a reflector, a sample arm comprising optics for guiding the probing beam towards the scanned object and for controlling the position of the probing beam on the object surface. The guiding optics may comprise an adjustable mirror for moving the probing beam over the object surface. An optical element, such as a beam splitter, can be arranged to split the probing beam from the light source into the sample arm and the reference arm and for combining the light returning from the object with the light returning from the reference arm. A detector detects the interference signal generated when the probing beam light returning from the object interferes with the signal returning from the reference arm. The wavelengths typically used in an OCT system are within the range of 800 nm to 1600 nm but also wavelengths outside this range can be applied.

A computer implemented algorithm can be applied to the signals read by the detector to generate an A scan of the object for each position of the probing beam on the object surface. This algorithm may be stored in the non-transitory computer readable medium of the computing system and executed by the data processing unit.

The computing system comprising a non-transitory computer readable medium on which algorithms are stored as instructions and a data processing unit for executing the instructions of the algorithms, where the algorithms are configured for performing certain operations can be realized by a computing system comprising a data processing unit and a non-transitory computer readable medium encoded with a computer program product comprising processor executable instructions for performing these instructions.

Disclosed is a position encoder for encoding the position of a probing beam of an optical coherence tomography (OCT) scanner, where the encoder comprises a pattern at least partly formed by a plurality of first regions of a first transmissivity and a plurality of second regions of a second transmissivity, where the first transmissivity is higher than the second transmissivity.

If the OCT scanner employs a range of wavelengths during scanning, such as in OCT scanners using a swept source laser or a broadband light source, the first transmissivity is higher than the second transmissivity over the entire range of employed wavelengths.

In some embodiments, the encoder pattern comprises a number of parallel lines or a grid of accurately known line width and pitch. Lines suffice for OCT scanners recording only B scans, while for C scan recording, it is beneficial to use a grid or a checkerboard, such that the encoder pattern does not appear alike in the B scans that make up the C scan.

Another approach for better accuracy is to use a parallel-line pattern that is rotated slightly with respect to the B direction, e.g., by 22 degrees. The lines will appear to have different width in the beam's forward and backward movement, respectively, so by keeping track of the number of width transitions, one can infer a distance in the C direction.

The encoder can be used in an optical coherence tomography scanner to encode the position of the probing beam when this is moved over the object surface. The encoder is placed in the optical path of the probing beam between the light source and the scanned object providing that the beam position can be tracked directly based on spatial variations in the intensity of the probing beam light transmitted thought the encoder.

In some embodiments, the encoder is arranged after the optics used for controlling the position of the probing beam on the object, i.e. between the object and the controlling optics during a scanning.

The encoder should comprise at least two types of regions with distinct values of transmissivity. More types of regions can be used to encode additional information, for example also allowing inference of beam direction. The pattern elements can either have a higher or a lower transmissivity than the remainder of the encoder. At least some pattern elements should be made with sufficient reduction in the transmissivity to be detected in the A scans, but at the same time not too low transmissivity to cause any significant degradation of the recording of the object further away than the pattern. The pattern preferably supply sufficient information for deducing the probing beam position and/or inclination for all A scans used to generate the sub-surface B or C scan.

In some embodiments, both the first transmissivity and the second transmissivity are finite, i.e. the transmissivity of both the first and second regions are non-zero at the wavelength of the probing beam.

Having a finite transmissivities in both types of regions of the pattern, i.e. the first and second regions, provides the advantage that encoder pattern does not obstruct the view to any parts of the scanned object. Data from the scanned object can thus be can be recorded behind both the first and second regions of the position encoder. The invention thus exploits the advantage of OCT being able to image also beneath a surface, hence also beneath an encoder pattern having regions with finite transmissivity.

In some embodiments, both the first transmissivity and the second transmissivity are higher than about 0.7, such as higher than about 0.8, such as higher than about 0.9, such as higher than about 0.95.

Such high transmissivities provide that data can be acquired from all parts of the object even those arranged behind the less transmissive regions of the encoder pattern.

The disclosed encoder thus allows for the geometrical correction without causing that regions of the object are not scanned. In contrast, prior art encoders operating by reflecting light have regions of high reflectivity preventing data to be recorded from the parts of the object beneath the high reflectivity regions.

When the encoder is arranged in the optical path of the probing beam the A scan shows the reflecting surface of the position encoder and reflecting parts of the scanned object, such as the object surface and transitions between subsurface structures of the object having different refractive indices. The encoder is hence seen together with the object in the A scan and can be used to establish the geometrical reference for object data in the A scan.

In some embodiments, the pattern is at least partly formed by alternating first and second regions.

In some embodiments, the encoder comprises a substrate on which a patterned anti-reflective coating layer is defined. The substrate is generally transmissive in the range of wavelengths employed by the OCT scanner while the patterned anti-reflective coating layer provides that the transmissivity of the encoder varies over the encoder plane. The sections of the patterned anti-reflective coating which best suppresses reflection defines the first regions of the pattern having the higher transmissivity.

When a silica glass substrate is used the difference between the refractive index of the glass and the surrounding air will result in a reflection of at least 4% at the substrate surface in regions without the anti-reflection coating. Arranging an anti-reflecting coating at the substrate surface can reduce the reflection down to 0.1% and accordingly increase the transmissivity in these regions. The anti-reflecting coating may comprise a single layer of Magnesium Fluoride or certain transparent fluoropolymers, or alternating layers of high and low index materials.

The encoder pattern can be formed by a patterned anti-reflective coating layer where voids are defined between sections of anti-reflective material. Such an encoder can be generated by arranging or depositing a uniform layer of anti-reflective material on the substrate and subsequently etching selected portions of the anti-reflective material away e.g. using a mask to cover those portions of the layer of anti-reflective material which is supposed to stay after the etching. The patterned anti-reflective coating layer may also be generated by depositing the material of the anti-reflective coating on selected regions of the substrate. The anti-reflective material can e.g. be deposited onto the substrate layer using a mask, where openings in the mask define the regions where the anti-reflective material is deposited. In both cases the first regions of the encoder pattern are then defined where the anti-reflection material is present while the second regions are defined by the sections where anti-reflective material is absent.

The patterned layer can also be defined by etching substrate material away in some regions thus forming recesses in the substrate layer and subsequently depositing the anti-reflective material into the recesses. This procedure provides a pattern of alternating sections of the anti-reflective material and sections of substrate material where the transmissivity in the regions with anti-reflective material is higher than in those with only substrate material.

The anti-reflective coating layer can be patterned by e.g. electron beam induced damage of selected regions where the anti-reflective property of the coating layer is deteriorated in the electron beam exposed regions. These electron beam exposed regions define the second regions of the encoder pattern while the regions with the undamaged anti-reflective coating having the higher transmissivity define the first regions of the encoder pattern.

In some embodiments, the encoder comprises a substrate layer in which a patterned has been defined by removal of substrate layer material, e.g. by etching of the pattern in a glass plate. The transmissivity pattern of the encoder can then be generated from varying thickness of an otherwise homogeneous substrate.

The patterned anti-reflective coating layer may also be generated by a patterned layer comprising two or more types of anti-reflective material as long as the anti-reflecting properties differ to provide different transmissivities in the respective regions of the encoder pattern.

When the encoder pattern is defined by a patterned anti-reflection coating the encoder pattern can be created from alternating regions of different anti-reflective coatings which provide different transmissivities for the different regions of the encoder or from alternating regions with and without anti-reflective coating.

In some embodiments, the regions of the pattern are arranged with a translational symmetry along at least one direction in the plane of the pattern. The first and second regions in the pattern may e.g. be arranged in a line pattern or a grid.

In some embodiments, the width of the first and second regions in the plane of the pattern are different. The reduced transmissivity in the second type of regions causes less probing light to reach the scanned object. When the first region is wider that the second region, the regions where less light reaches the object is made smaller and the encoder disturbs the scanning even less.

In order to raise the overall transmissivity of the position encoder a homogeneous layer of anti-reflective material may be arranged on the surface of the substrate layer opposite to the patterned layer. This homogeneous layer suppresses the reflection at the substrate-air interface over the entire encoder pattern and provides that more light reaches the scanned object and that signals from reflections from the opposite surface of the encoder are suppressed in the scans.

In some embodiments, the encoder is implemented on an anti-reflection coated glass plate, where a reflecting material, such as chromium is deposited in the second regions of the pattern.

Optimal accuracy over the entire encoder surface is obtained when the encoder surface is perpendicular to the beam in its central position over the range of motion.

There is a tradeoff in that transmissivity contrast within the pattern increases the encoder signal clarity, but reduces the signal-to-noise ratio for those parts of the scanned object located underneath low-transmissivity parts of the pattern.

The image of the pattern, i.e. the signal from the pattern in the recorded B and C scans, can be used to derive position by the same principles employed by traditional optical encoders known in the art. Then, the image of the pattern can be easily removed or blanked out in the OCT scanner's output.

The identification of the image of the pattern from the recorded OCT signal is typically implemented in software. Identification can be performed in multiple ways, including but not limited to direct thresholding, convolutions, edge-detection methods. Depending on choice of pattern different appearances are viable candidates for detection. Common to most are edge-transitions, possibly accompanied with transition types. For example, a three-transmissivity pattern (value codes 0, 1, 2) pattern has six possible transitions (0-1, 0-2, 1-2, 1-0, 2-0, 2-1).

For computationally efficient detection of the encoder pattern in the OCT images, at least approximate knowledge about the geometry of the beam's trajectory in relation to the surface can be exploited. This knowledge can come from the known nominal construction of the OCT scanner, and/or calibration. With this knowledge, e.g., the search region can be reduced.

The identification of the image of the pattern from the recorded OCT signal can take advantage of other knowledge of the system. For example, the mirror's known driving force limits the possible lines seen at any time to a distinct choice. The resulting identification is then not only time points for transitions but time points for transitions over specific lines.

In some embodiments, taking into account the deduced probing beam position and/or inclination comprises correcting for difference in the inclination of the A scans of the sequence when generating the sub-surface scan.

The moving-beam can be implemented with a moveable mirror such as a MEMS mirror. The movement can be along one or multiple axes. For example for C scans, the mirror typically needs two rotational axes.

If a movable mirror steers the OCT beam, the signal reflected back from the pattern can also be used to calculate the exact position and range of movement of the MEMS mirror.

Particularly in swept-source OCT, the time required for recording of an A scan can be significant relative to the speed at which the beam is moved between different positions on the object surface. It may thus be advantageous to use encoder information to also establish a depth coordinate of the recorded information.

An OCT scanner according to this invention may also implement a trigger mechanism for recording B and/or C scans. The trigger can be an enable-type trigger. In this way, less information needs to be extracted from the encoder.

In the specific instance of a trigger for each C scan, the geometric information in the pattern should be sufficient to identify the position of each B scan, and within those each A scan. The practical requirements will vary on auxiliary information in the system.

Under the assumption that C- and B-motion are sufficiently discrepant, patterns that are sufficient for tracing motion in both B and C scans include, but is not limited to, checkerboard and grid patterns.

For a MEMS mirror the known driving force can be used to derive candidate timeframes and the encoder need only be unique within each timeframe. Examples of patterns sufficient to trace motion over B scans include, e.g., homogenous and non-homogeneous line patterns oriented within the angular span against the C-direction that guarantees sufficient crossings of the beam over the encoder pattern.

In some embodiments, the OCT scanner comprises a probe which is the part of the OCT system which engages the scanned object. Preferably, the optical and electrical elements inside such an OCT scanner probe are protected from mechanical or other environmental impact.

In some embodiments, the scanner comprises a protective window in the area where the probing beam leaves the probe and the encoder pattern is implemented on a surface of the protective window. Preferably, the encoder pattern is implemented on the surface of the protective window that faces towards the inside of the probe. In this way, it is protected from mechanical impact. Furthermore, because the protective glass usually has a significant thickness, the distance between the pattern and the scanned object will also be significant, making easy to remove or blank out the pattern's image in the scanner's output without impacting the recording of the actual region of interest. Another advance of placing the pattern on the protective glass and hence close to the scanner object is better accuracy than could be achieved with placements closer to the mirror.

In some cases, e.g. when the scanned object is relative close to the encoder during scanning, it may be preferred that the encoder pattern is implemented on the surface of the encoder that faces away from the scanned object to provide a longer distance between the pattern and the object surface. In other cases, e.g. reflections only can be detected from a relatively narrow range of distances, it may be preferred that the encoder pattern is implemented on the surface of the encoder that faces towards the scanned object to provide a shorter distance between the pattern and the object surface.

In some embodiments, the sub-surface scan comprises a B scan, i.e. a B scan of the object is generated based on at least part of the A scans. The B scan is often generated by combining data from a sequence of A scans obtained with probing beam positions distributed along a substantially straight line referred to as the B direction.

When the pattern of the encoder is detected in the sequence of A scans the correct position and inclination on the object where each A scan is recorded can be determined and the algorithms used for generating the B scan can compensate for the difference in inclination between the individual A scans. The detected encoder pattern is thus used to establish a geometrical reference for data in the individual A scans relating to the scanned object when generating the B scan.

In some embodiments, the sub-surface scan comprises a C scan. The C scan may be generated directly from a sequence of A scans distributed over an area of the object surface such that a 3D sub-surface scan is provided or from a number of B scans each generated from a sequence of A scans.

In some embodiments, the algorithms comprises instructions for generating a C scan of the object based on at least part of the sequence of A scans and where the deduced probing beam position and/or inclination for at least one of the A scans is taken into account when creating said C scan.

In some embodiments, the algorithms comprises instructions for generating a C scan of the object based on a number generated B scans. The algorithms are then preferably configured for deducing, based on the detected encoder pattern, the probing beam position and/or inclination for at least one B scan and taking this taking into account when generating the C scan from said B scans.

In some embodiments, the optical coherence tomography system is a swept-source optical coherence tomography system.

Disclosed is a method for recording sub-surface scans of an object using an optical coherence tomography scanner, said method comprising:
  moving a probing beam over the surface of the scanned object and recording sub-surface data for different probing beam positions on the object, where the probing the beam path passes through a position encoder comprising an encoder pattern at least partly formed by a plurality of first regions of a first transmissivity and a plurality of second regions of a second transmissivity, where the first transmissivity is higher than the second transmissivity;
  generating a sequence of A scans from the recorded sub-surface data;
  detecting the encoder pattern in said sequence of said A scans;

deducing based on the detected encoder pattern the probing beam position and/or inclination for at least one A scan of said sequence of A scans; and generating a sub-surface scan of the object based on the sequence of A scans taking into account the deduced probing beam position and/or inclination.

In some embodiments, both the first transmissivity and the second transmissivity are finite, i.e. the transmissivity of both the first and second regions are non-zero. In some embodiments, both the first transmissivity and the second transmissivity are higher than about 0.7, such as higher than about 0.8, such as higher than about 0.9, such as higher than about 0.95.

The disclosed inventive concept is not limited to OCT scanners but may also be applied to e.g. X-ray scanners. Accordingly a scanner for recording sub-surface information of an object is disclosed, said scanner comprising:

an optical system configured for projecting a probing beam onto the scanned object for recording a partial scan of the object where said partial scan comprises data relating to sub-surface structures in the scanned object;

a position encoder arranged in the path of the probing beam, where the encoder comprises a pattern at least partly formed by a plurality of first regions of a first transmissivity and a plurality of second regions of a second transmissivity, where the first transmissivity is higher than the second transmissivity; and a computing system comprising a non-transitory computer readable medium on which algorithms are stored as instructions and a data processing unit for executing the instructions of the algorithms, where the algorithms are configured for:

detecting the encoder pattern in a sequence of partial scans;

deducing based on the detected encoder pattern the probing beam position and/or inclination for at least one partial scan; and generating a sub-surface scan of the object based on the sequence of recorded partial scans taking into account the deduced probing beam position and/or inclination.

The present invention relates to different aspects including the methods and systems described above and in the following, and corresponding methods, systems, and/or user interfaces, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
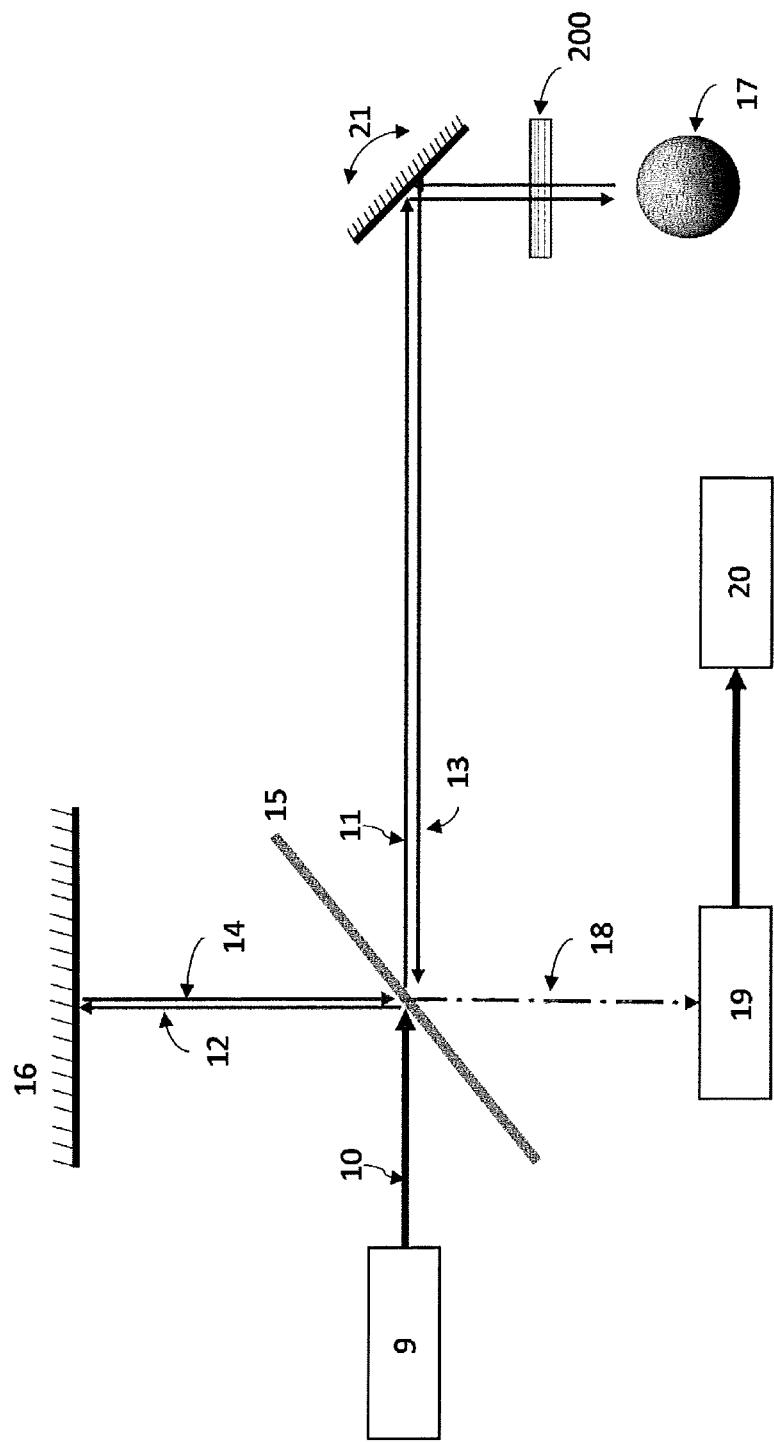
FIG. 1 shows an embodiment of an OCT system.

FIG. 1 illustrates part of a very simple OCT system which has an interferometric system composed of a swept-source laser 9, a beam splitter 15, a photo-detector 19, and a reference arm with mirror 16. The laser can e.g. provide light which is swept over a 40 nm wide range around 1550 nm. The system can sample an object 17 with at least one reflective surface. The swept-source laser 9 emits a laser beam 10 which is divided by the beam-splitter 15 into sample-beam 11 and reference beam 12. The reflected reference beam 14 and reflected sample beam 13 produce an interference signal 18 at the detector 19. The detector 19 output is connected to data-acquisition electronics 20 providing analog-to-digital conversion. The MEMS mirror 21 steers the beam across the surface of the object 17 such that the interferometric system is configured for projecting the probing beam onto different positions on the scanned object. The scanner may contain additional optical elements for focusing the beam, but for the sake of simplicity, none are shown in FIG. 1. The encoder 200 is located between the mirror 21 and the scanner object 17.

Further processing and visualization can be on a PC (not shown here) operating as a computing device which generates the sub-surface scan from the data recorded by the interferometric system. Sub-surface data for the A scans are derived from interference signals generated by light of the probing beam returning from the object surface and from a reference arm of the interferometric system of the OCT scanner. A sequence of A scans can be generated by recording at a number of probing beam positions sub-surface data of the object and generating an A scan from the sub-surface data recorded for each probing beam position.

The probing beam position for the A scan deduced from the data of the A scan relating to the pattern is used to establish the geometrical reference for data in the A scan relating to the scanned object. Using the established geometrical reference the computing system can generate geometrical correct B and C scans.

Figure 2A:
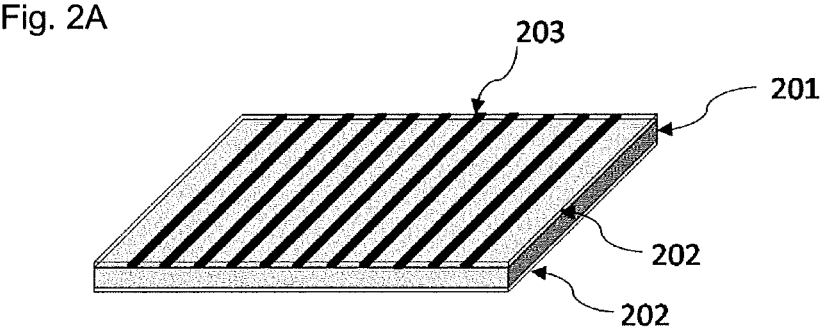
FIGS. 2A, 2B, and 2C show schematics of a position encoder.
Figure 2B:
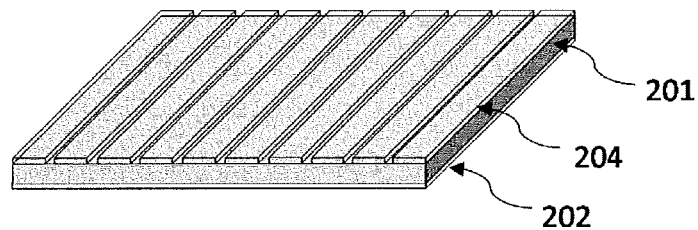

FIG. 2A shows a close-up view of two embodiments of the encoder 200. The main substrate 201 can e.g. be produced in glass. There is an anti-reflective coating layer 202 on both sides. In the embodiment of FIG. 2A, the anti-reflective coating has been etched in parallel lines on the top surface 203. In the embodiment of FIG. 2B, the anti-reflective coating 204 has only been deposited in a pattern with some lines masked out. Both embodiments have a pattern of two regions with distinct and finite values of transmissivity for light at the wavelength of the probing beam. In other embodiments, the pattern can consist of other elements, such as squares arranged in a checkerboard pattern.

Figure 2C:
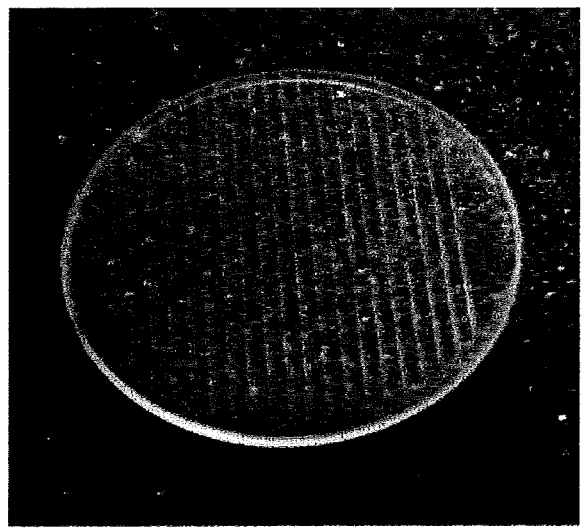

FIG. 2C shows a picture of an embodiment of the position encoder based on a glass plate. Layers of anti-reflection coating are deposited on both sides of the glass plate. The encoder pattern is defined in the coating on one side by electron-beam modification which reduces the transmissivity in the exposed sections thereby forming the second regions of the pattern. The second regions are with the reduced transmissivity are thin compared to the lines of un-exposed regions such that the encoder pattern interferes as little as possible with the scanning.

Figure 3:
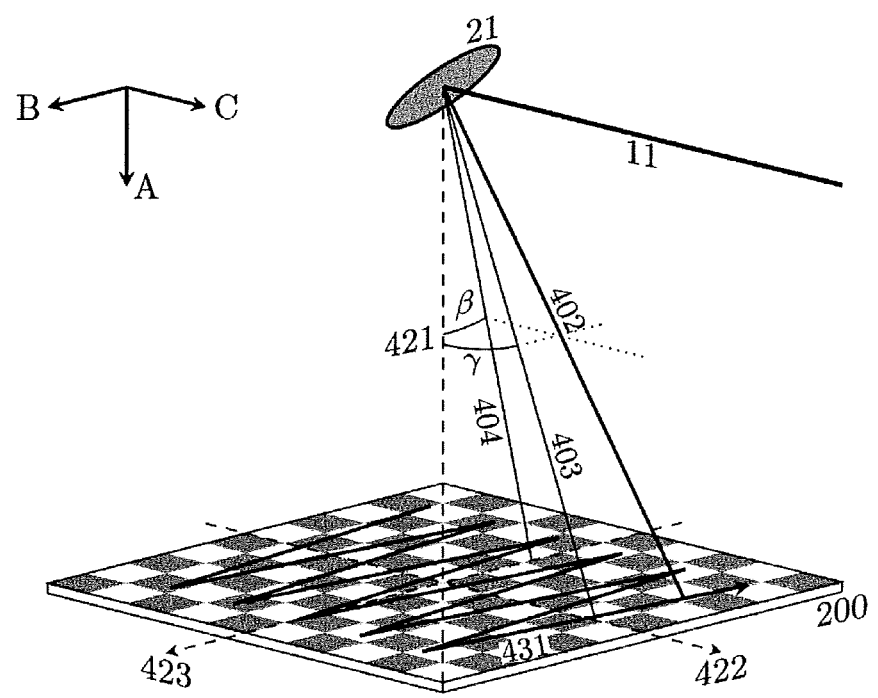
FIG. 3 illustrate steps of scanning an object.

FIG. 3 shows a close-up view of the probe region of an OCT system according to FIG. 1. By construction the region in front of the encoder surface is empty, i.e. air or vacuum, and can be expected to have no significant response or refractive distortions. The incoming laser beam 11 is directed by the mirror 21 over an encoder 200, here with a checkerboard pattern. The pivot point lies in the center of the mirror 21. The mechanics of the mirror is such that the pivot point is stationary or near stationary, i.e. motion negligible, under rotations of the mirror. The sample beam 11 is moved rapidly in B direction and slowly in C direction, generating a scan line 431 over the encoder. Because distances are small, it is a very good approximation to assume that sample beam and reflected sample beam are collinear, such that they jointly can be denoted as beam 402.

The direction of beam 402 can be expressed uniquely as the angular divergence from the symmetry line 421. The most convenient choice is to measure the two angles along the components 403 and 404 of the beam 402, viewed as a vector. These components are defined by the projection of 402 onto the lines 422 and 423 respectively. These are in turn simply the direction of B and C scan. The angle corresponding to motion in B will be denoted $\beta$ and the angle corresponding to motion in C will be denoted $\gamma$.

Collecting A scans under the motion of the mirror will form a 2D structured dataset, denoted D(t, d), with time on one axis and distance from pivot point on the other axis. For practical purposes, D(t, d) can be considered a geometrically distorted 3D point cloud. Formally we are looking for the mapping D(t, d)→D($\beta$, $\gamma$, d), with $\beta$, $\gamma$ the mirror angles in B scan and C scan directions respectively. Once these angles are known, the desired volume D(x,y,z), i.e. the Cartesian 3D volume, can be obtained through methods known in the art, e.g., Westphal et al. 2002: *Correction of geometric and refractive image distortions in optical coherence tomography applying Fermat's principle*, Optics Express 10 (9), 397-404; and Wang et al 2013: *Correction of image distortions in endoscopic optical coherence tomography based on two-axis scanning MEMS mirrors*, Biomedical Optics Express 4 (10), 2066-2077.

The encoder of this invention finds the angles $\beta$, $\gamma$, and it does so in a robust manner. A strategy for doing so can be broken down in the following steps, illustrated here in detail for one particular embodiment, where the pattern has areas of high and low reflectivity:

1. For efficiency of the computations, establish a depth range for possible locations of the surface within D(t, d). This range follows from the known geometry of the scanner.
2. Locate stretches of surface within the depth range of step 1, indicating the areas of low transmissivity. Depending on the width of the range, and the proximity to true sample behind the encoder surface, and the expected void in front of it, this detector is realized as a first surface detector. A candidate first surface point is established for all A scans by searching for a sufficiently strong response along the depth. Due to artifacts, the inherent desire for the encoder to only have weak interaction with the laser, these candidates risk ending up behind the first physical surface. To compensate for this and finding a smooth surface with strong support among candidates the surface is established as the solution to a total variation problem, penalizing points behind the best smooth candidate more than points in front by an unevenly weighted L1 norm penalty. Smoothness is enforced through the Huber norm on central difference of depth estimates. The resulting convex optimization problem is solved to high accuracy using the Alternating Direction Method of Multipliers.
3. Detect the lateral extent of encoder features, i.e., the low-transmissivity areas, in the images, either as edges within the surface of step 2 (transitions between high and low transmissivity) or, for greater robustness, centers between edges.
4. Find the match between the pattern features found in step 3 and the pattern features on the physical encoder. In its simplest form, this can be achieved by counting. The problem solution can be made more robust by introducing a model of the motion of the mirror given its physical characteristics. A moving mirror that is actuated by supplying a driving force can be modelled as a harmonic oscillator, which has strong theoretical foundation.
5. Establish time t to angles $\beta$, $\gamma$ mapping. Given the result of step 4, it is now known for each encoder feature when it was recorded, because the recording time of the corresponding A scan or neighboring A scans is known. Because also the physical dimensions in the encoder pattern are known, the angles can be found by simple trigonometry.

For a given OCT system, not all of the methods for achieving robustness mentioned under steps 1-5 above may be needed. It is also conceivable that more robustness is needed. Additional robustness can be achieved, e.g., by the mirror emitting a trigger signal on each turn, disregarding encoder features seen near the turning point of the mirror, i.e., where not both edges may be seen, etc.

The simple OCT setup of FIG. 1 and hence FIG. 3 has no additional optical elements such as a, e.g., a focusing lens for the beam 402. Such elements may often be advantageous to have. The case with optical components is however completely analogous, given that they have known fixed geometry. The true physical pattern can be back-projected along the optical path, and the theoretical appearance of an equivalent pattern located in front of any optical component can be obtained. The requirement is as before that the encoder should have sufficient information for tracking the beam.

Figure 4A:
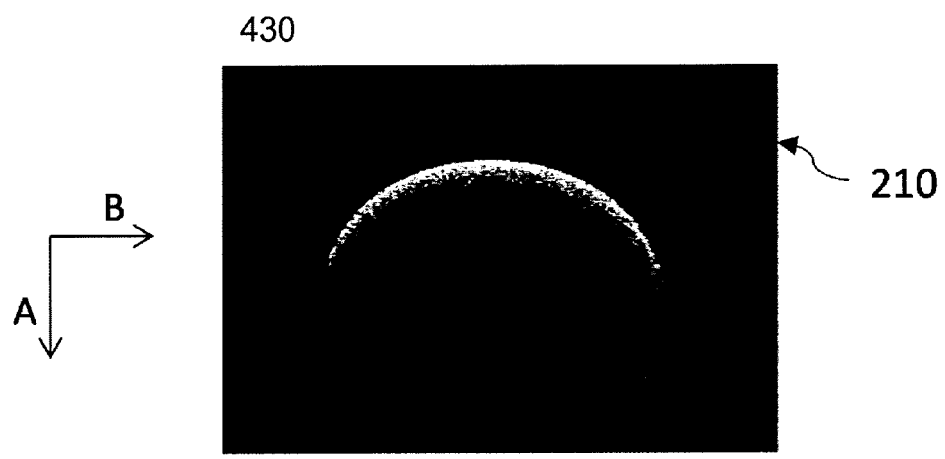
FIGS. 4A and 4B show an example of the enabled geometrical correction.
Figure 4B:
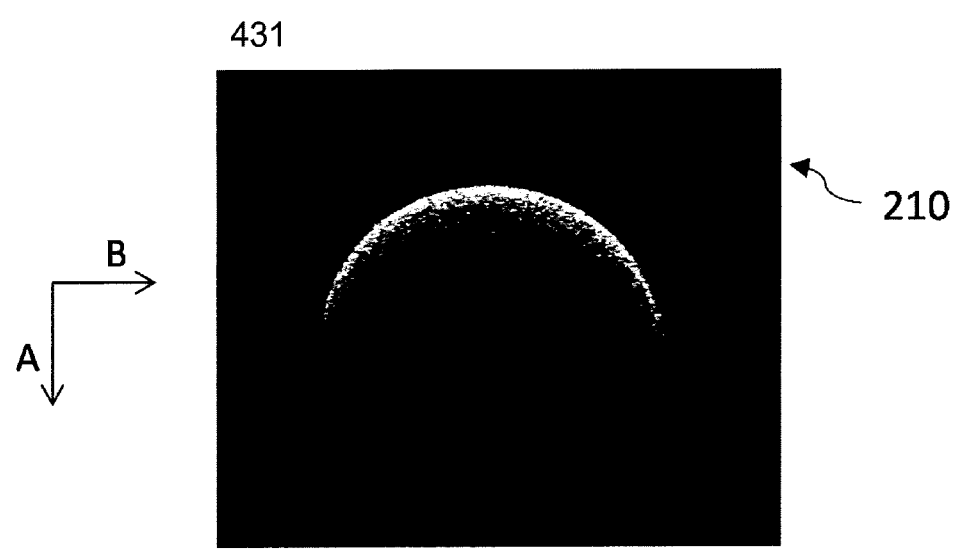

FIG. 4 shows an example of the geometrical correction enabled by this invention and using a light source swept over a range of 40 nm around 1550 nm. FIG. 4A shows a raw OCT B scan image 430 of a spherical object that is created by simply plotting generated A scans side by side, as if they were parallel and not located along beams of a fan originating from the mirror's pivot point. Accordingly, the representation of the object surface is not geometrically correct and does not show the object surface as spherical. Also, the encoder surface 210 appears warped in space. Because the mirror angular motion is approximately a sinusoidal, the encoder pattern appears to have varying distances and lengths, even though the actual pattern does not. FIG. 4B shows the same scene after the geometrical corrections made possible by this invention. Now the B scan represents the true form of the spherical object. For illustrative purposes, the encoder surface is still shown in FIG. 4B, but in a typical application, it generally would not be.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An optical coherence tomography scanner for recording sub-surface scans of an object, wherein the optical coherence tomography scanner comprises:
   an interferometric system configured for projecting a probing beam onto the scanned object and recording sub-surface data at different probing beam positions on the scanned object;
   a position encoder arranged in the path of the probing beam, where the encoder comprises a pattern at least partly formed by a plurality of first regions of a first transmissivity and a plurality of second regions of a second transmissivity, where the first transmissivity is higher than the second transmissivity;
   a protective window wherein the encoder pattern is implemented on a surface of the protective window; and
   a computing system comprising a non-transitory computer readable medium on which algorithms are stored as instructions and a hardware processor configured to execute the instructions of the algorithms, where the algorithms are configured for:
      generating a sequence of A scans from the recorded sub-surface data;
      detecting the encoder pattern in said sequence of said A scans;
      deducing based on the detected encoder pattern the probing beam position and/or inclination for at least one A scan of said sequence of A scans; and
      generating a sub-surface scan of the object based on the sequence of A scans taking into account the deduced probing beam position and/or inclination.

2. The optical coherence tomography scanner according to claim 1, wherein the transmissivity of both the first and second regions are non-zero at the wavelength of the probing beam.

3. The optical coherence tomography scanner according to claim 2, wherein the transmissivity of both the first and second regions are higher than about 0.7.

4. The optical coherence tomography scanner according to claim 2, wherein the pattern at least partly is formed by alternating first and second regions.

5. The optical coherence tomography scanner according to claim 1, wherein the regions of the pattern are arranged with a translational symmetry along at least one direction in the plane of the pattern.

6. The optical coherence tomography scanner according to claim 1, wherein the sub-surface scan comprises a B scan and/or a C scan.

7. The optical coherence tomography scanner according to claim 1, wherein the optical coherence tomography system is a swept-source optical coherence tomography system.

8. A method for recording sub-surface scans of an object using an optical coherence tomography scanner comprising an interferometric system configured for projecting a probing beam onto the scanned object and recording sub-surface data at different probing beam positions on the scanned object; a position encoder arranged in the path of the probing beam, where the encoder comprises a pattern at least partly formed by a plurality of first regions of a first transmissivity and a plurality of second regions of a second transmissivity, where the first transmissivity is higher than the second transmissivity; and a protective window wherein the encoder pattern is implemented on a surface of the protective window, said method comprising:
   recording sub-surface data for different probing beam positions on the object;
   generating a sequence of A scans from the recorded sub-surface data;
   detecting the encoder pattern in said sequence of said A scans;
   deducing based on the detected encoder pattern the probing beam position and/or inclination for at least one A scan of said sequence of A scans; and
   generating a sub-surface scan of the object based on the sequence of A scans taking into account the deduced probing beam position and/or inclination.

9. A position encoder for encoding the position of a probing beam of an optical coherence tomography scanner having a protective window, where the encoder comprises a pattern at least partly formed by a plurality of first regions of a first transmissivity and a plurality of second regions of a second transmissivity, where the first transmissivity is higher than the second transmissivity, wherein the position encoder pattern is implemented on a surface of the protective window, and is configured for being detected in a sequence of A scans in the optical coherence tomography scanner.

* * * * *